(No Model.) 4 Sheets—Sheet 1.
G. H. BABCOCK, S. WILCOX & N. W. PRATT.
Steam Engine.

No. 240,357. Patented April 19, 1881.

Witnesses.
W. Colborne Brookes
W. C. Dey

Inventors
G. H. Babcock
S. Wilcox
N. W. Pratt
by their attorney T. S. Stetson (No Model.) 4 Sheets—Sheet 3.

G. H. BABCOCK, S. WILCOX & N. W. PRATT.
Steam Engine.

No. 240,357. Patented April 19, 1881.

Witnesses:
W. Colborne Brookes
W. C. Dey

Inventors
G. H. Babcock
S. Wilcox
N. W. Pratt
their attorneys
J. D. Stetson (No Model.) 4 Sheets—Sheet 4.
G. H. BABCOCK, S. WILCOX & N. W. PRATT.
Steam Engine.
No. 240,357. Patented April 19, 1881.
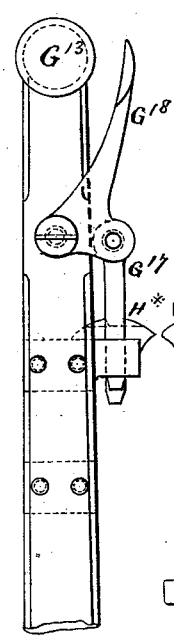
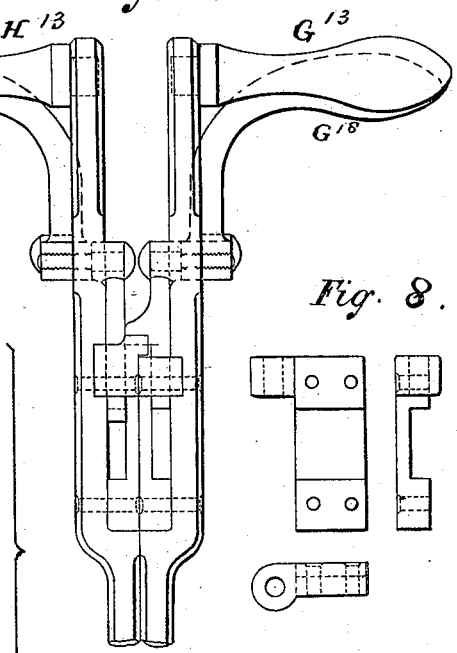
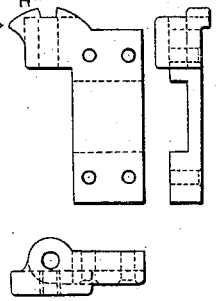
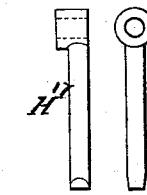
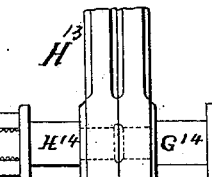
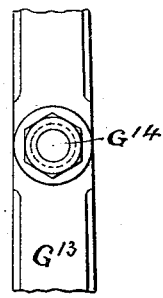
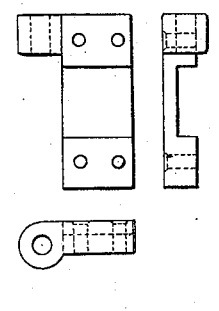
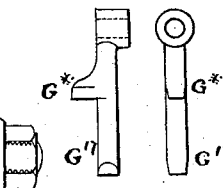
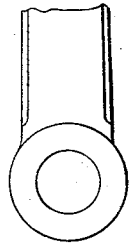
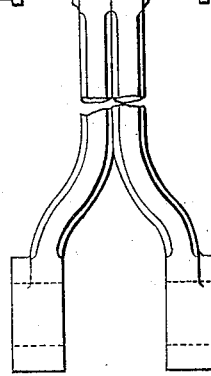
Witnesses.
W. Colborn Brookes
W. C. Dey
Inventors
G. H. Babcock
S. Wilcox
N. W. Pratt
by their attorney J. L. Stetson

UNITED STATES PATENT OFFICE.

GEORGE H. BABCOCK, OF PLAINFIELD, NEW JERSEY, AND STEPHEN WILCOX AND NATHANIEL W. PRATT, OF BROOKLYN, NEW YORK; SAID PRATT ASSIGNOR TO SAID BABCOCK AND WILCOX.

STEAM-ENGINE.

SPECIFICATION forming part of Letters Patent No. 240,357, dated April 19, 1881.

Application filed June 28, 1880. (No model.)

*To all whom it may concern:*

Be it known that we, GEORGE H. BABCOCK, a citizen of the United States, residing at Plainfield, Union county, in the State of New Jersey, STEPHEN WILCOX, a citizen of the United States, residing in Brooklyn, Kings county, in the State of New York, and NATHANIEL W. PRATT, a citizen of the United States, residing at Brooklyn aforesaid, have invented certain new and useful Improvements Relating to Steam-Engines, of which the following is a specification.

Our invention may apply to engines of any size and for any purpose. We will describe it as applied to an upright engine adapted for driving a small vessel by means of a screw-propeller, the engine being compound. We use the term "steam-engine" as applying also to analogous engines worked by vapor of ether or by other gaseous fluid operating in a similar manner.

The accompanying drawings form a part of this specification, and represent what we consider the best means of carrying out the invention.

The two cylinders are mounted directly in line, one over the other, the smallest or higher pressure-cylinder being uppermost. The upper cylinder is supported on a short casting intermediate between it and the lower cylinder. The lower cylinder is carried on a rigid frame bolted on a short bed bridging across a space between wood keelsons. The air-pump is built in one side of the framing and forms a part thereof.

Figure 1:
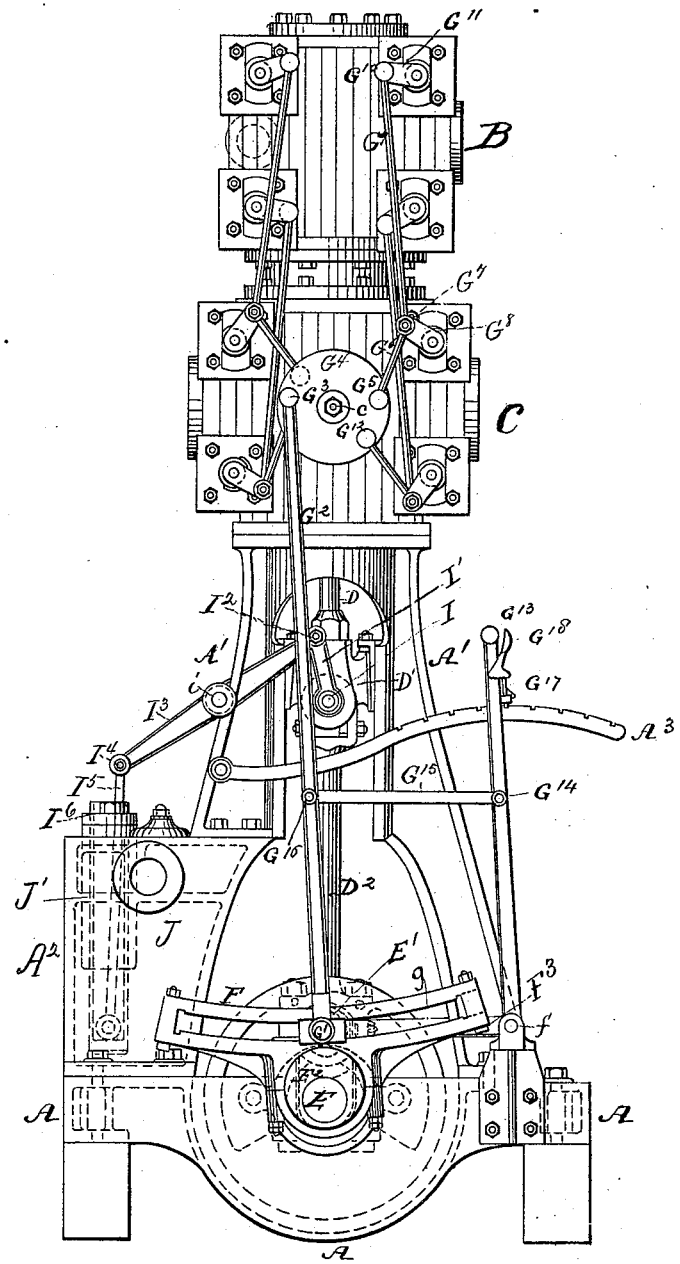
Figure 2:
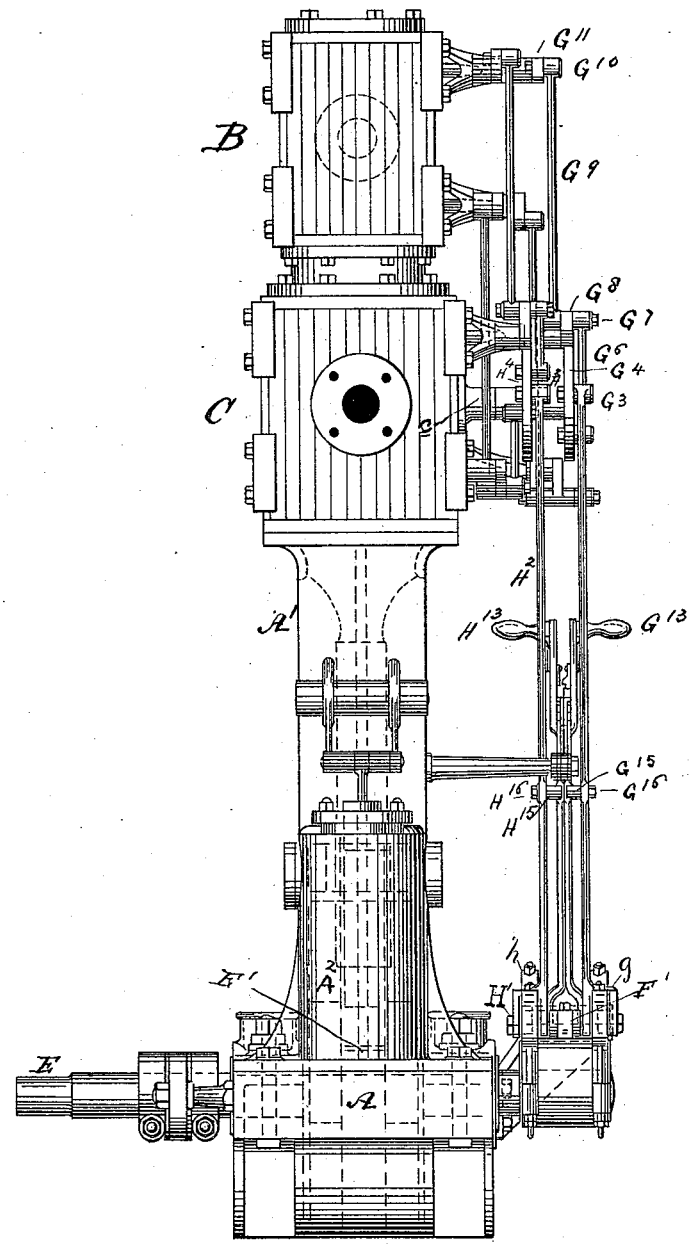
Figure 3:
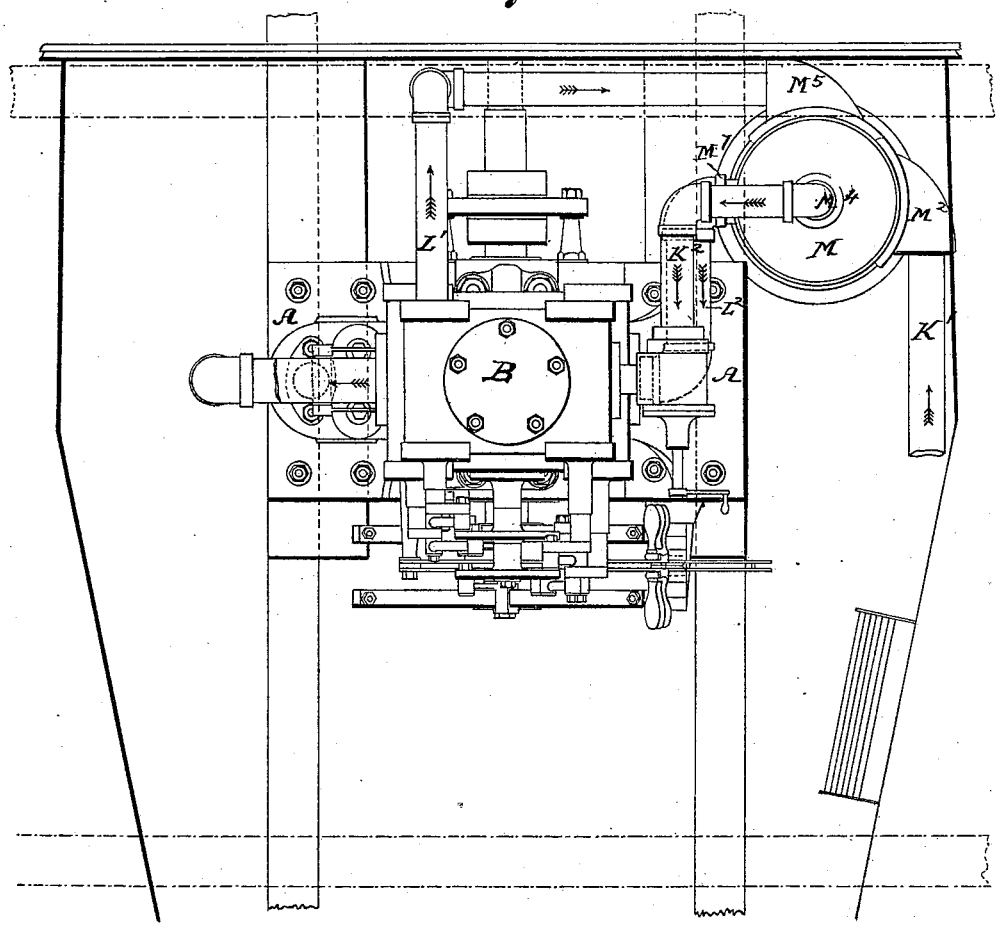
Figure 4:
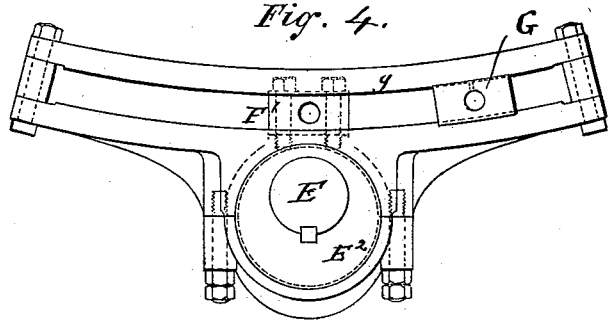
Figure 5:
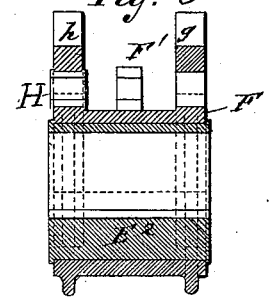

In the drawings, Figure 1 is a side elevation; Fig. 2, an elevation at right angles to Fig. 1, and Fig. 3 is a plan view. Fig. 4 is a side view, and Fig. 5 is a central vertical section through certain portions detached. They represent the eccentric and links through which motion is imparted to the trains of mechanism for working the steam and exhaust valves. Fig. 6 is a side view, and Fig. 7 an edge view, of the two levers by which the valve-operating mechanism is controlled. Fig. 8 represents details of the levers which control the steam-valves, and Fig. 9 the details of the mechanism which controls the exhaust-valves.

Similar letters of reference indicate like parts in all the figures.

A is the bed-plate; A', the principal portion of the upright framing, and $A^2$ the exterior of the air-pump.

B is the upper cylinder, and C the lower cylinder. A single piston-rod extends in the axial line through both cylinders. The part which protrudes through a stuffing-box at the bottom of the lower cylinder is marked D, and gives motion to a cross-head, D', which, through a connecting-rod, $D^2$, gives motion in the usual manner to a crank, E', on the main shaft E. A single wide eccentric, $E^2$, is fixed on the shaft E and gives motion through independent means to the valves of the two engines. The upper steam-valves of the two cylinders are tied together so as to work in unison. The lower steam-valves of the two steam-cylinders are correspondingly tied together and similarly worked together under all conditions. It will be understood that there are provisions for nicely adjusting the lengths of the rods so as to properly set each valve. The corresponding exhaust-valves of the two cylinders are similarly tied together, so as to work always alike with similar provisions for adjusting. There are two wrist-plates mounted side by side but capable of entirely independent motions. The common or fixed center is marked c. It is fixed on the side of the lower cylinder, C.

Our compound link, which works on the wide eccentric $E^2$, is peculiar. It is analogous to what is known as an "Allen link," but is not only a double-ended link adapted for running both ways, but is also a duplex link having two parallel parts. A separate link-block in each part or single link is connected by a suitable rod to one of the wrist-plates. One of the link-blocks works the wrist-plate for the steam-valves, and the other link-block works the wrist-plate for the exhaust-valves. By shifting both link-blocks from one end to the other of its respective link the engine may be reversed. Both blocks must, of course, be thus shifted simultaneously from one end to the other of their links, but each block is capable of being shifted to and from the center either simultaneously with the other or independently thereof. By shifting the two independently I can change the throw of the steam-valves, and thus change the degree of expansive working of the steam without changing the throw of the exhaust-valves, and thus without varying the time of the exhaust or the amount of cushioning.

We will refer to the duplex or double link as an entirety by the single letter F, but the front and back parts or single links of which it is composed we will denote, respectively, as $g$ and $h$. The link-blocks in each are correspondingly marked G for the front link-block working the steam-valves, and H for the back link-block working the exhaust-valves. A short arm stands between the two links, marked F'. It receives a pin which connects to a lateral link, $F^3$, linking it to a center, $f$, on the fixed frame-work. Under the action of the revolving eccentric E the double link F, confined by the link $F^3$, operates with a peculiar compound motion. It tilts or oscillates, working each end up and down, while its whole substance, including the central part of each curved slot $g$ and $h$, rises and sinks to the extent of the throw of the eccentric E sufficient for the lap and lead of the valves. This gives, properly conditioned, the effect of the well-known Stephenson link-motion. The engine will work the valves so as to turn the crank forward when the blocks G H are near one end of their respective links $g$ $h$, and will work backward when the blocks G H are near the other end of their respective links $g$ $h$, and will give a diminished throw to the valves, so as to work the steam more and more expansively as the respective blocks G and H are moved inward from either end to the central position, in which they are represented. We so proportion the parts that the cylinders will receive a very little steam at each revolution, sufficient to lubricate the surface when the blocks G H are exactly in the center of their respective links $g$ $h$.

From a pin, G', in the side of the link-block G, extends a rod, $G^2$, which is connected by a pin, $G^3$, to the front wrist-plate, $G^4$. This wrist-plate, by its pin $G^5$ and rod $G^6$, connects to the pin $G^7$ in the lever or arm $G^8$ of the upper steam-valve of the cylinder C. The rod $G^9$, from the same pin $G^6$, connects, through a pin, $G^{10}$, to the arm $G^{11}$ of the upper steam-valve of the upper cylinder, B. A corresponding train of connections from a lower pin, $G^{12}$, on the wrist-plate $G^4$ connects to the lower steam-valves of the respective cylinders. These valves—the steam-valves of the two cylinders—are all that are worked by the link-block G. The other link-block, H, connects, through a pin, H', rod $H^2$, and pin $H^3$, to the other wrist-plate, $H^4$, and works the entire train of exhaust-valves through corresponding connections, as will be obvious.

The link-blocks G and H are shifted in position in their respective links $g$ $h$ by the aid of two hand-levers, $G^{13}$ $H^{13}$, which are mounted free to turn together or independently on the fixed bolt or axis $f$. They are linked to the respective rods $G^2$ $H^2$ by rods $G^{15}$ $H^{15}$ and pins $G^{14}$ $G^{16}$ $H^{14}$ $H^{16}$. The levers $G^{13}$ $H^{13}$ are mounted near together, as indicated in Fig. 2, with two curved rods, $A^3$, between them, which are pivoted to and constitute in effect portions of the fixed framing. These rods are notched and receive catches or dogs $G^{17}$ $H^{17}$, controlled by bell-crank levers $G^{18}$ $H^{18}$, carried on the respective hand-levers $G^{13}$ $H^{13}$. They are actuated by springs, (not shown,) so as to engage their respective dogs with the bars $A^3$, being held firmly in any position in which they are left. It follows that either lever $G^{13}$ $H^{13}$ may be shifted outward or inward on its rod $A^3$, so as to change the throw of its respective set of valves for the steam or exhaust, as the case may be, without changing the throw of the other set of valves. At the same time the arrangement bringing the levers close together makes it very easy to shift both simultaneously in reversing. We have so formed and arranged the parts that the levers $G^{13}$ $H^{13}$ will lock themselves together automatically whenever they are brought into position side by side. When thus engaged the engineer may, by one hand applied on the lever $H^{13}$, reverse the engine by simultaneously shifting both link-blocks G and H in their respective links $g$ $h$; but whenever he desires to shift either link-block without shifting the other, as is frequently required in varying the degree of expansive working of the steam or in varying the degree of cushioning of the steam, he can disengage the levers $G^{13}$ $H^{13}$ and make them entirely independent.

The device by which the engagement and disengagement of the steam and exhaust mechanisms with each other are effected is shown in Figs. 6 to 9, where G* represents a projection on the side of the dog $G^{17}$, which, when the levers $G^{13}$ $H^{13}$ are moved past each other, traverses over a notched shelf, H*, extending out under it from the dog $H^{17}$.

Ordinarily it is expedient to hold the levers $G^{13}$ $H^{13}$ side by side. When this position is assumed, either permanently or temporarily, the dog $G^{17}$ will, when liberated by the hand of the engineer, engage in the notch in the shelf H* of the other dog $H^{17}$, and the lever $G^{13}$ will thenceforward be held by the other lever $H^{13}$, which latter is held by its dog $H^{17}$ in the proper position on the rod $A^3$, as will be understood. When thus conditioned both levers may be shifted simultaneously by simply applying the hand in the proper position on the lever $H^{13}$, grasping it firmly, so as to actuate the bell-crank lever $H^{18}$ and liberate its dog $H^{17}$, and then shifting it, and with it the engaged lever $G^{13}$, either into a more central or more extreme position, according as the steam is to be worked more or less expansively; and when, thus conditioned, it is desired to reverse the engines the engineer simply applies his hand to liberate the lever $H^{13}$, as before, and applying sufficient muscular force moves the lever $H^{13}$, and with it the engaged lever $G^{13}$, past the central position and over so far toward the other extreme position as shall be desired. Wherever he leaves it, the dog $H^{17}$ will engage with the proper notch in the rod $A^3$, and hold not only the lever $H^{13}$, which he grasped directly, but also the other one, $G^{13}$, which has been necessarily carried with it. It will now be seen that whenever only the lever $H^{13}$ is operated and the other lever $G^{13}$ is neglected the shelf $H^*$ carried on the dog $H^{17}$ will automatically lift the dog $G^{17}$ of the other lever $G^{13}$ whenever one lever is moved past the other, and, engaging it with itself, compel the said other lever $G^{13}$ to travel with it until the engineer intentionally disengages it. This greatly facilitates the working and reversing of the engines in emergencies, as a threatened collision or the like. But it is easy to move the lever $G^{13}$ past the lever $H^{13}$ without engaging them together while the dog $H^{17}$ is down, because the same elevation of the dog $G^{17}$ which is required to clear it from the notches in $A^3$ will allow it to be moved across over the shelf $H^*$ without touching.

The cross-head D is connected by a pin, I, link I', and pin $I^2$, to a lever, $I^3$, which turns on a fixed center, $i$, and is connected at its other extremity by a pin, $I^4$, and rod $I^5$, and a suitable pin in the interior to the hollow plunger $I^6$, which works through a suitable stuffing-box and guiding means to allow its serving, in connection with other parts, as an efficient air-pump.

The air-pump body J is formed as a part of the fixed frame-work.

Modifications may be made in the forms and proportions of the details.

In taking the steam from the boiler to the upper cylinder we conduct it through a vessel, M, in which it parts with any water which has been brought over from the boiler, and in being transferred from the upper cylinder, B, to the lower cylinder, C, it passes through another portion of the same vessel, and first parts with its water of condensation and subsequently by the contact with surfaces heated by the hotter steam above is thoroughly dried and slightly superheated before it is used in the lower cylinder, C. These points we esteem very important, and they are made the subject of a separate application for patent; but they may be omitted.

The connection of the rod $G^6$ to the valve-arm $G^8$, and of the corresponding rod with the corresponding arm on the lower steam-valve, may be permanent, as shown, or in large engines these connections may be of the automatically-detaching character, such as are employed in what are known as "Corliss engines." We prefer for all small engines a positive and permanent connection.

The provisions for adjustment at will of the rods $G^9$ between the valves of the upper and lower cylinder may be omitted, taking care to adjust the parts with great accuracy in the fitting of the rods.

Some portions of the invention may be used with advantage without the others, but we prefer the whole used together. Our levers $G^{13}$ $H^{13}$ and their several attachments may be used with advantage on simple engines.

With either simple or compound engines we can lock the exhaust-lever H in the best position for exhausting and cushioning with the proposed rate of revolution, and then shift the link-block G and its connecting train of mechanism by hand or by the action of a governor either constantly or at short intervals.

Some of the advantages due to certain features of the invention may be separately enumerated, as follows:

First, by reason of the connections $G^6$ $H^6$ between the several valves of the high-pressure cylinder B and the corresponding valves of the low-pressure cylinder C we are able to work the valves of both engines by the same mechanism, and to insure that the initial pressure in the second cylinder shall be uniform.

Second, by reason of our duplex or double Allen link $g\ h$ and separate link-blocks G H and their attachments for the steam and exhaust valves, respectively, we are able by simple means to reverse at will and also to vary the throw of the steam and exhaust valves either equally or unequally.

Third, by reason of the levers $G^{13}$ $H^{13}$, arranged side by side on the same axis, but turning independently and connected, respectively, to the trains of mechanism for operating the steam and exhaust valves, we are able to more conveniently reverse and change the conditions for working the steam and exhaust valves together or separately, as may be required.

Fourth, by reason of the projection $G^*$ on the dog $G^{17}$ of the one lever $G^{13}$, and of the shelf $H^*$ on the dog $H^{17}$ of the other lever $H^{13}$, we are able to more conveniently work the levers together and to insure their simultaneous working in sudden emergencies, as rapid reversing.

We intend making the construction of the pump the subject of a separate application for patent.

We claim as our invention—

1. The combination, with a steam-engine having separate steam and exhaust valves, of the eccentric $E^2$, links $g\ h$, and separate link-blocks G and H with their trains of connections, as herein specified.

2. In a steam-engine having independent sets of mechanism for adjusting the degree of expansion, the two levers $G^{13}$ $H^{13}$, combined and arranged relatively to each other and to the valve-operating mechanism, as herein specified.

3. In a steam-engine, the dog $G^{17}$, having a projection, $G^*$, in combination with the dog $H^{17}$, having the shelf $H^*$, and the levers $G^{13}$ $H^{13}$, notched bar or bars $A^3$, and the trains of mechanism for separately operating the steam and exhaust valves, as herein specified.

In testimony whereof we have hereunto set our hands, at New York city, this 8th day of June, 1880, in the presence of two subscribing witnesses.

GEO. H. BABCOCK.
STEPHEN WILCOX.
NAT. W. PRATT.

Witnesses:
W. COLBORNE BROOKES,
W. L. BENNEM.